(12) United States Patent
Quast et al.

(10) Patent No.: US 6,602,162 B2
(45) Date of Patent: Aug. 5, 2003

(54) CONTROL DEVICE FOR THE INTERNAL COMBUSTION ENGINE AND THE AUTOMATIC GEARBOX OF A MOTOR VEHICLE

(75) Inventors: Joerg-Rainer Quast, Cologne (DE); Stefan Kniesburges, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/008,639

(22) Filed: Dec. 10, 2001

(65) Prior Publication Data

US 2002/0077216 A1 Jun. 20, 2002

(30) Foreign Application Priority Data

Dec. 5, 2000 (EP) .............................. 00126659

(51) Int. Cl.[7] .......................... B60K 41/06; B60K 41/28
(52) U.S. Cl. ............................ 477/92; 477/108; 701/52
(58) Field of Search ...................... 477/92, 108; 701/52

(56) References Cited

U.S. PATENT DOCUMENTS

| 5,335,743 A | * | 8/1994 | Gillbrand et al. ........... 180/178 |
| 5,393,277 A | | 2/1995 | White et al. |
| 5,545,108 A | | 8/1996 | Wagner et al. |
| 6,017,290 A | * | 1/2000 | Kinoshita et al. ........... 477/108 |
| 6,067,492 A | * | 5/2000 | Tabata et al. ................. 701/51 |
| 6,149,546 A | * | 11/2000 | Tabata et al. ................ 477/125 |
| 6,260,432 B1 | * | 7/2001 | Ehrmaier et al. ......... 74/473.18 |
| 6,352,492 B1 | * | 3/2002 | Steeby et al. ............... 477/109 |

FOREIGN PATENT DOCUMENTS

| EP | 0469731 A | 7/1991 |
| EP | 0607655 A | 10/1993 |
| EP | 0875698 A | 11/1998 |

* cited by examiner

Primary Examiner—Sherry Estremsky

(57) ABSTRACT

An input device having keys for selecting rearward driving (R), neutral position (N) and forward driving (D), as well as a decrementing control switch (5) and incrementing control switch (4) for manually lowering and raising the gear stage. Starting from the gearbox mode of the input device and the forward driving (ASM) operating state, a tempomat mode (TM) can be adopted by actuating the key (D). The actuation of the operating elements is interpreted in the tempomat mode as a command for the tempomat, it being possible, in particular, for the decrementing and incrementing control switches (4, 5) to be used for lowering or raising the desired speed. A return to the gearbox mode takes place through renewed actuation of the "D" key or actuation of the brake (6).

5 Claims, 1 Drawing Sheet

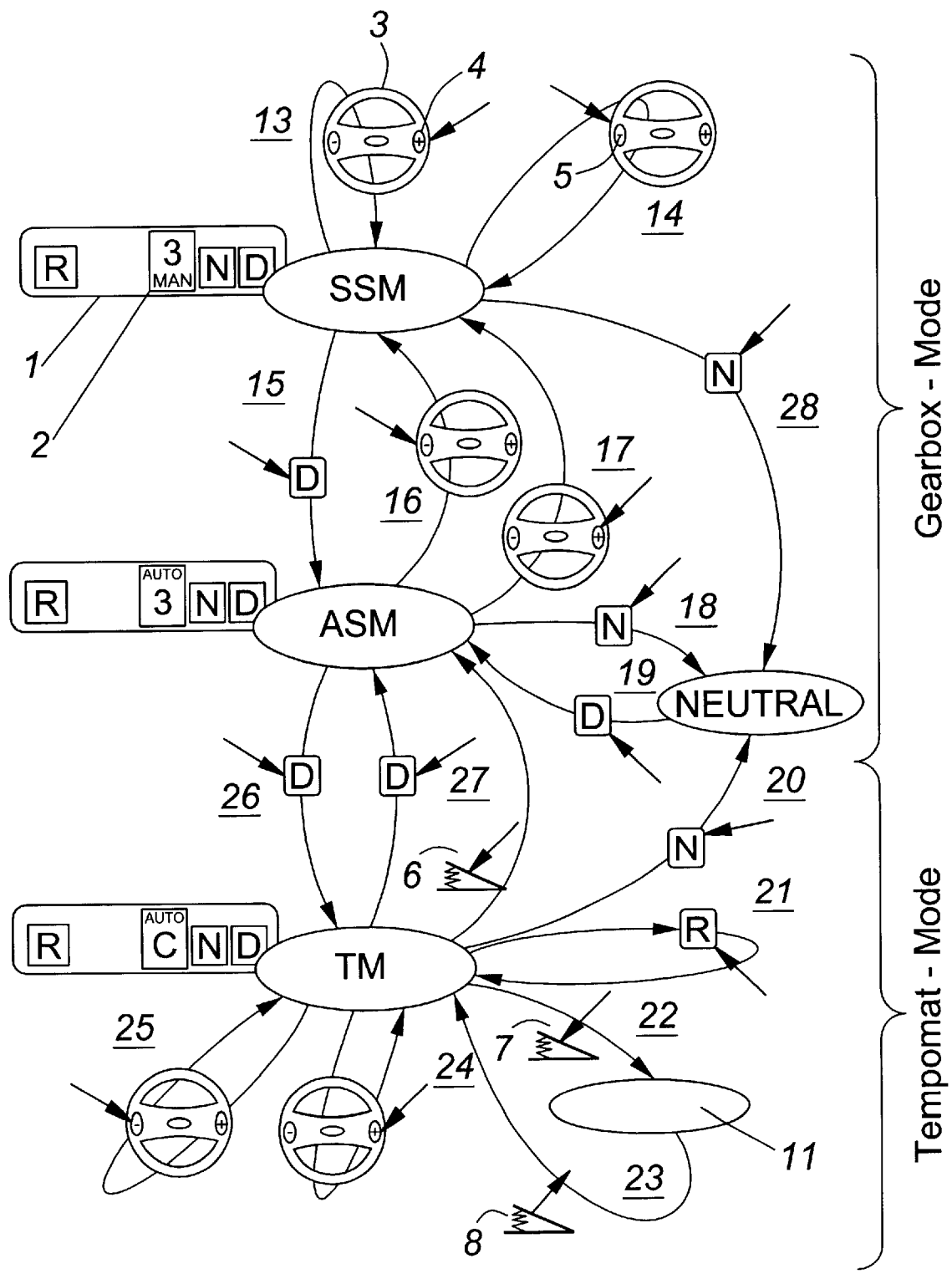

CONTROL DEVICE FOR THE INTERNAL COMBUSTION ENGINE AND THE AUTOMATIC GEARBOX OF A MOTOR VEHICLE

BACKGROUND OF THE INVENTION

1. Field of the Invention

The invention relates to a control device for the internal combustion engine and the automatic gearbox of a motor vehicle, including a tempomat and an input device with operating elements which permit commands to be input to the gearbox controller in the gearbox mode of the input device.

2. Description of the Prior Art

A control device of the type mentioned at the beginning is disclosed in DE 691 00 712 T2. The control device is located in a motor vehicle which has an internal combustion engine and an automatic gearbox coupled to the internal combustion engine. In this case, the automatic gearbox is actuated by the control device in a known way, that is to say it is switched over between various transmission ratios as a function of operating parameters of the motor vehicle. In particular, the switchover between two gears takes place in accordance with prescribed characteristics as a function of the engine speed and the fuel feed to the engine.

Furthermore, the known control device includes an input device in the form of a shift lever for the driver to input operating commands. In this case, the input device is always in a "gearbox mode" in which the set positions of the shift lever are interpreted as commands for the gearbox controller. In particular, the shift lever can be used to set the operating states of "forward driving" (D), "neutral position" or "idling" (N), and "rearward driving" (R).

Furthermore, the control device of DE 691 00 712 T2 has what is termed a tempomat, that is to say a device for automatically regulating the cruising speed ("cruise control"). A desired cruising speed can be prescribed via such a tempomat and is then automatically maintained by the vehicle without the driver needing to perform further operations. However, the driver retains the option of over-riding the prescriptions of the tempomat by actuating the gas pedal or the brake, and thus of being able to intervene at any time in the driving process.

With the tempomat switched in, the control device disclosed in DE 691 00 712 T2 acquires specific vehicle operating parameters and their change with time, in order to detect whether the vehicle is subject to increased power requirements when driving uphill. In this case, the control device for the automatic gearbox is switched over into what is termed the "kick-down" operating state which can normally (with disconnected tempomat) be switched in only by the driver by kicking the gas pedal down completely. In this kick-down operating state, the engine speeds prescribed for a gear shift are raised (incremented) to increase power, and so the engine is driven at higher speed overall.

In the known control devices, the corresponding control modules for the automatic gearbox and for the tempomat are separated from one another and are to be actuated via dedicated operating elements in each case. This leads to a higher number of operating elements which are to be actuated by the driver, and thus to a greater complexity in the vehicle control, an increased space requirement in the instrumented area of the vehicle and, not least, to higher manufacturing costs for the vehicle.

Against this background, it was the object of the present invention to configure a control device of the type mentioned at the beginning in a fashion which is more cost-effective, compact and simpler to operate.

SUMMARY

The control device serves for controlling the internal combustion engine and the automatic gearbox, coupled thereto, in a motor vehicle. It contains a tempomat, that is to say an automatic cruise control, and an input device with operating elements which, in the "gearbox mode" of the input device, permit setting of the gearbox controller or inputting of commands for this purpose. The control device is defined by the fact that its input device can adopt a tempomat mode in which at least one of the operating elements permits setting of the tempomat or inputting of commands for this purpose.

By contrast with known control devices, the control device according to the invention is therefore not split into two separate and mutually independent modules, one module exclusively serving the purpose of gearbox control, and the other module exclusively serving the purpose of speed control (tempomat). Rather, the two control tasks are combined, at least with reference to the input device, which constitutes the user interface of the control device. This comes about by virtue of the fact that, in addition to the gearbox mode, the input device can also further adopt a second operating mode, the "tempomat mode", in which the actuation of at least one of the operating elements is no longer interpreted as a command for the gearbox controller, but as a command for the tempomat. The double-function operating element can be used, for example, to switch in or disconnect the activity of the tempomat, or to prescribe the desired speed.

Owing to this double function of at least one operating element and of the input device, it is possible, firstly, to achieve a simplification of the handling of the control device, since the number of operating elements is diminished, and thus the risk of maloperations is reduced. In particular, in the case of input devices arranged on a steering wheel, such a minimization of the number of operating elements is particularly to be desired. Secondly, savings in space and components are also achieved, the latter leading, in turn, to lower manufacturing costs for the control device.

In accordance with one embodiment of the control device, among the operating elements is an input element which is denoted below in a simplified way as a "switch" and which serves to set the "forward driving" operating state for the gearbox controller. In the operating state of forward driving, the forward gears of the gearbox are automatically changed in a known way depending on the operating conditions of the vehicle. Furthermore, the input device is set up such that it can be switched back and forth between the gearbox mode in the "forward driving" operating state and the tempomat mode by actuating the switch for forward driving. The switch for forward driving therefore acquires the additional function of switching the input device over between said modes. A separate switch for switching over between the gearbox and tempomat modes can therefore be saved by means of the additional function of this switch. Furthermore, the forward driving switch is suggested, in particular, because the tempomat mode is always required only in the "forward driving" operating state of the gearbox controller, and the switch for forward driving usually has no function in the tempomat mode. This switch is required only for the purpose of switching over from other operating states such as, for example, the neutral position or rearward driving into the forward driving operating state.

In accordance with another advantageous refinement of the invention, among the operating elements of the input device are input means for setting variables, the actuation of which in the gearbox mode of the input device effects a gear shift, and in the tempomat mode of the input device effects a change in the desired speed. The input means for setting variables can be used to set the value of a variable which can change in steps or continuously. In the gearbox mode, this variable is, in particular, the (discrete) stage of the selected gear, that is to say the value 1, 2, 3, etc. By contrast, in the tempomat mode the variable is the desired speed which is to be maintained by the tempomat.

The input means for setting variables can, in particular, be two control switches, one control switch serving to increment the basic variable, and the other control switch serving to decrement it. Thus, in the gearbox mode the incrementing control switch can shift up by a gear stage, and in the tempomat mode it can raise the desired speed by a prescribed difference or a prescribed percentage. Correspondingly, in the gearbox mode the decrementing control switch can shift down by a gear stage, and in the tempomat mode it can lower the desired speed by a prescribed difference or a prescribed percentage.

Furthermore, the input device is preferably configured such that it goes over from the tempomat mode into the gearbox mode upon actuation of the motor vehicle brake if it was in the tempomat mode initially. This refinement takes into account that after actuation of the brake there is a higher probability that the driver wishes to use the input device to operate the gearbox controller. For example, after a stoppage of the motor vehicle the driver will regularly want to bring the gearbox controller into the operating state of the neutral position.

The input device is preferably configured in this case in such a way that the outlined automatic transition from the tempomat mode to the gearbox mode upon actuation of the brake constitutes a setting of the configuration of the control device which the driver can optionally switch in or disconnect. In a similar way, actuation of the gas pedal can effect a transition from the tempomat mode to the gearbox mode. This automatic transition can also preferably be designed as a configuration of the control device which can be selected by the driver.

It may be pointed out that the transition from the tempomat mode to the gearbox mode of the input device (or vice versa) is not to be equated with the termination (starting) of the activity of the tempomat. Rather, as is known from the prior art, the driver can, if required, override the automatic control of the tempomat by actuating the brake and/or the gas pedal, control going over to the tempomat again when this overriding is withdrawn.

The operating elements of the input device can include, in particular, a switch for rearward driving and a switch for the neutral position of the gearbox. In this case, the input device is preferably configured such that the actuation of the switch for rearward driving has no effect in the tempomat mode. Alternatively, however, it is also possible, for example, for the activity of the tempomat to be switched in or disconnected via this switch. The actuation of the switch for the neutral position can have the same function in the tempomat mode as in the gearbox mode, that is to say can effect the transition of the gearbox to idling.

In accordance with one development, the control device includes a display device on which an indication of the tempomat mode is displayed when the input device is in the tempomat mode. Thus, with the aid of the display device the driver has the information at any time on whether the input device is in the tempomat mode or not (that is to say in the gearbox mode).

DESCRIPTION OF THE DRAWINGS

The invention is explained below by way of example with the aid of the FIGURE.

The sole FIGURE illustrates the transitions between the two different operating modes and the operating states (substates of the operating modes) for a control device according to the invention.

DETAILED DESCRIPTION

The control device for the automatic gearbox of a motor vehicle (not illustrated) and the tempomat of the motor vehicle has an input device 1 which serves as interface for the user, that is to say the motor vehicle driver. The input device 1 has various operating elements "R", "N" and "D" which are constructed in the form of keys or switches and are arranged in a common area of the operating console. An incrementing control switch 4 ("+") and a decrementing control switch 5 ("−") also belong to the operating elements. The control switches 4 and 5 are preferably arranged on a steering wheel 3 of the motor vehicle.

Furthermore, there is provided on the console of the input device 1 a display device 2 which can be configured as a liquid crystal display (LCD) or the like, for example.

The mode of operation of the input device 1 is explained below with reference to the state transitions illustrated in the FIGURE by arrows. In this case, a short arrow is used respectively to indicate at each of the arrows which operating element is to be actuated in order to effect the state transition symbolized by the arrow.

The starting point of the functional description is formed by the state "ASM", illustrated in the middle, of the input device in the gearbox mode with the "forward driving: automatic shifting" operating state. In this operating state, the gearbox controller switches over automatically between the available forward gears of the gearbox. This automatic function is symbolized in the display 2 by the letters "AUTO". Furthermore, the gear stage currently selected— "3" in the example—is illustrated in the display 2.

The following key actuations are possible in the initial state ASM outlined:

Actuation of the control switch "N", which leads to a transition 18 in the neutral position (idling, "NEUTRAL") of the gearbox;

Actuation of the incrementing control switch 4 on the steering wheel 3, which effects a transition 17 into the state "SSM" for manual operation; and Actuation of the decrementing control switch 5 on the steering wheel 3, which likewise effects a transition 16 into the state "SSM" in manual operation.

An actuation of the control switch "D" for forward driving leads back from the neutral position ("NEUTRAL") into the state "ASM" (transition 19).

In the manual operating state "SSM", the driver influences the selection of the gears by hand. This operating state is symbolized in the display 2 by the letters "MAN". The respectively selected gear stage is also illustrated in the display 2.

Raising the gear stage by one 13 is effected in the operating state "SSM" by simply actuating the incrementing control switch 4 (transition 13), while lowering the gear stage by one 14 is effected by simply actuating the decrementing control switch 5 (transition 14). In this case, the input device remains respectively in the operating state "SSM".

A return 15 from the state "SSM" into the mode with automatic gearbox control "ASM" is effected by actuating the switch "D" for forward driving. Moreover, the manual gearbox control "SSM" can be left with a jump 28 into the neutral position ("NEUTRAL") by actuating the control switch "N".

Moreover, there is also an operating state for rearward driving R, but a detailed description thereof is dispensed with.

The mode of operation of the control device and the input device 1 which has been illustrated so far corresponds substantially to the known functioning of a gearbox controller, which takes place exclusively in the "gearbox mode". The development of the input device 1 according to the invention is achieved by providing a further mode, specifically the "tempomat mode" (TM). This tempomat mode is adopted when, starting from the gearbox mode and the operating state "ASM" for automatic shifting, the control switch "D" is actuated (transition 26).

In the display 2 of the input device 1, the tempomat mode is indicated by displaying a letter "C" ("cruise control") instead of the gear stage selected. The display "AUTO", which indicates that automatic control of the gear stages is active, is retained alongside.

The following key actuations are possible in the tempomat mode (state TM):

Pressing the incrementing control switch (+), which raises 24 the desired speed for the tempomat by a prescribed magnitude, for example 5 km/h, or by a prescribed percentage, for example 5%;

Pressing the decrementing control switch 5, which lowers the desired speed 25 for the tempomat by a prescribed magnitude, for example 5 km/h, or by a prescribed percentage, for example 5%;

Pressing the neutral position control switch "N", which results in a transition 20 into the neutral position of the gearbox and leaving the tempomat mode by returning to the gearbox mode;

Pressing the rearward driving control switch "R", which has no effect (transition 21); alternatively, the activity of the tempomat can also be switched in or disconnected by actuating this control switch; and Pressing the forward driving control switch "D", which results in leaving the tempomat mode and a return 27 to the gearbox mode in the state "ASM".

Moreover, actuation of the gas pedal 7 or 8 and of the brake pedal 6 in the tempomat mode is taken into account in the control. Thus, pressing 22 the gas pedal 7 effects an additional acceleration 11, while releasing the gas pedal 8 terminates the acceleration and effects a return to the tempomat speed. The tempomat mode is not left in this case by actuating the gas pedal.

If, by contrast, the brake 6 is actuated in the tempomat mode, there is a return to the gearbox mode in the state "ASM".

The control device according to the invention is not limited to the configuration of the operating elements that is illustrated in the FIGURE. Rather, it can be used advantageously in various refinements of the user interfaces such as, for example, also in the case of user interfaces with shift levers as operating elements.

What is claimed is:

1. In a powertrain for a motor vehicle having an internal combustion engine and an automatic gearbox, a control device comprising:

a device for regulating the speed of the vehicle;

an input device having a gearbox mode in which positions are selected representing desired operating ranges of the gearbox, and a tempomat mode in which selection of at least one of the desired operating range positions permits commands to be input to said vehicle speed regulating device; the input device including a first switch for selecting forward driving of the vehicle, and wherein the input device can be switched between the gearbox mode in a forward driving operating state of the automatic gearbox and the tempomat mode by actuating the first switch.

2. The control device of claim 1, wherein the input device includes input means for selecting positions representing desired operating ranges of the gearbox, and wherein actuation of the input means in the gearbox mode of the input device produces a gear ratio change of the gearbox, and actuation of the input means in the tempomat mode of the input device produces a change in the desired speed of the vehicle.

3. The control device of claim 1, wherein motor vehicle further includes a vehicle brake, and wherein the input device changes state from the tempomat mode to the gearbox mode upon actuation of the vehicle brake.

4. The control device of claim 1, wherein the input device includes a second switch for selecting rearward driving and a third switch for neutral position of the gearbox, actuation of the second switch having no effect in the tempomat mode.

5. The control device of claim 1, further comprising a display device for displaying a visual indication of operation in the tempomat mode when said input device is in the tempomat mode.

* * * * *